United States Patent [19]

Fujita et al.

[11] Patent Number: 5,065,182
[45] Date of Patent: Nov. 12, 1991

[54] IMAGE FORMING SYSTEM

[75] Inventors: Masafumi Fujita; Kazuhiko Tezuka; Masaaki Kuriyama, all of Osaka, Japan

[73] Assignee: Minolta Camera Kabushiki Kaisha, Osaka, Japan

[21] Appl. No.: 524,233

[22] Filed: May 15, 1990

[30] Foreign Application Priority Data

May 19, 1989 [JP] Japan .................. 1-125865
May 19, 1989 [JP] Japan .................. 1-125866

[51] Int. Cl.$^5$ .............................. G03G 21/00
[52] U.S. Cl. ........................ 355/202; 355/45; 355/218
[58] Field of Search ............ 355/202, 218, 45, 200, 355/44, 40, 68

[56] References Cited

U.S. PATENT DOCUMENTS

| 4,708,464 | 11/1987 | Otsuki et al. | 355/45 |
|---|---|---|---|
| 4,739,368 | 4/1988 | Lachut et al. | 355/218 X |
| 4,751,553 | 6/1988 | Fukasawa | 355/45 |
| 4,786,945 | 11/1988 | Sambayashi et al. | 355/44 X |
| 4,821,067 | 4/1989 | Oushiden et al. | 355/45 |
| 4,839,696 | 6/1989 | Ohtani | 355/218 |
| 4,873,553 | 10/1989 | Otsuki | 355/45 X |
| 4,879,572 | 11/1989 | Onuki | 355/45 |
| 4,931,828 | 6/1990 | Fujita et al. | 355/45 |
| 4,958,186 | 9/1990 | Sashida | 355/45 X |

FOREIGN PATENT DOCUMENTS 56-110924  9/1981  Japan .
61-134749  6/1986  Japan .

Primary Examiner—A. T. Grimley
Assistant Examiner—Sandra L. Hoffman
Attorney, Agent, or Firm—Willian, Brinks, Olds, Hofer, Gilson & Lione

[57] ABSTRACT

An image forming apparatus provided with an image forming part capable of reproducing on a recording medium an image information frame recorded on a microfilm. The apparatus effects a decision as to whether or not image information is present within the range of a prescribed width inwardly of the edge of the image information frame. When the presence of the image information in the range mentioned above is discerned, the part of the projected light reaching the image forming part which falls outside the edge is intercepted and the image information within the image information frame is completely reproduced on the recording medium. When the absence of the image information in the aforementioned range is confirmed, the part of the projected light which falls outside the edge and within the range of the prescribed width inwardly of the edge is intercepted so that the background part of the negative film is not reproduced on the recording medium. The position of the edge of the image information frame is discerned by the fact that the density of the projected light is automatically detected with a sensor while the light is en route to the image forming part. During the detection of the position of the edge of the image information frame, the detection of the density of the projected light is performed outwardly from the central part of the image information frame.

20 Claims, 13 Drawing Sheets

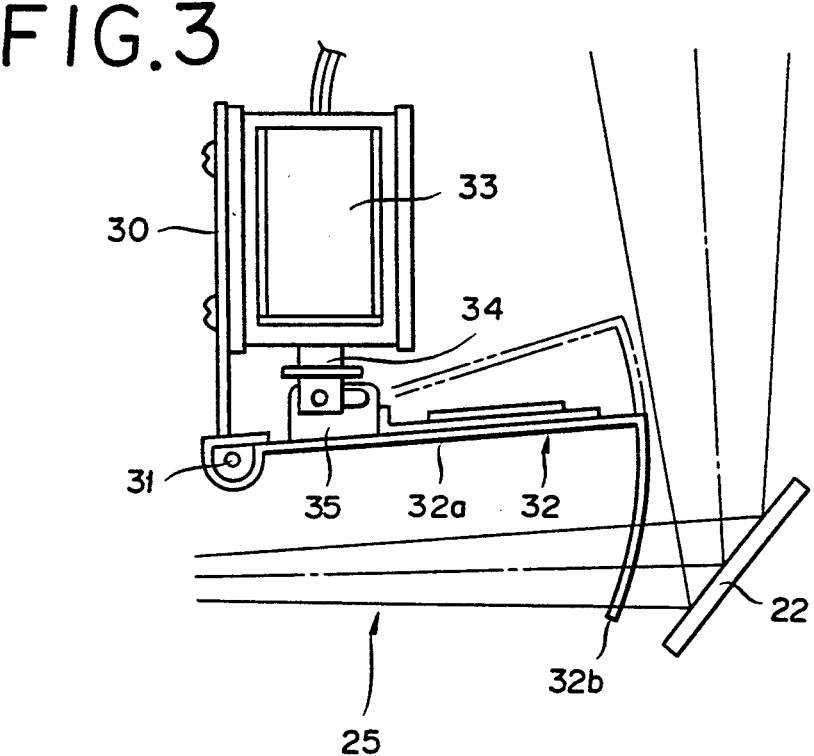
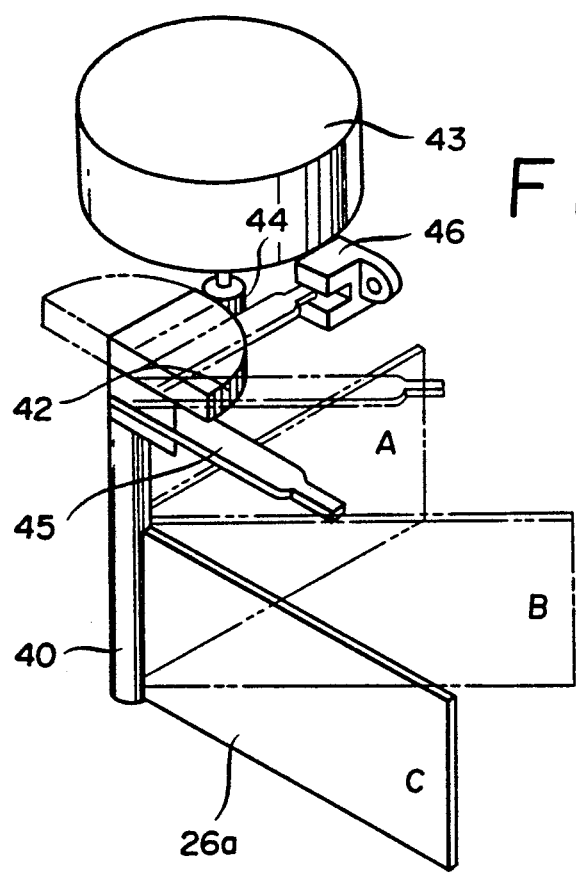

IMAGE FORMING SYSTEM

BACKGROUND OF THE INVENTION

1. Field of the Invention

This invention relates to an image forming system to be used in reproducing on a recording paper an image recorded on a microfilm.

2. Description of the Related Art

The microfilm to be used in the reader printer is either a positive film or a negative film, depending on the occasion. FIG. 15 is a diagram illustrating part of a microfilm M of the type to be taken up in the form of a roll. The microfilm M shown in this diagram contains in each of the image information frames F a negative image consisting of an image information A such as a letter recorded in a transparent figure in the frame and the remainder in a black (dark) background as indicated by hatching. The part of the microfilm M surrounding the image information frames F and excepting marks B for retrieval such as blip marks or document marks is transparent.

When the information A recorded in the form of a negative image as described above is to be reproduced on a recording paper, the transparent part of the image information A is reproduced in a positive figure on the recording paper by reversal development using an electrophotographic image forming apparatus provided with a photosensitive element. When the transparent background part of the microfilm M surrounding the image information frames F is exposed to the light directed to the photosensitive element during the reproduction of the recorded image on the recording paper, this part is formed in a black figure on the recording paper not only to impair the appearance of a printed image but also to increase the consumption of the toner.

In case where the negative image formed on the microfilm M as illustrated in FIG. 15 is to be reproduced on the recording paper, an effective measure must be taken to keep the part G of film surrounding the rectangular image information from F and containing no recorded image (hereinafter referred to as "background part of film"), namely the background part G of film outside the border line E between the image information frame F and the background part G of film, from being reproduced on the recording paper. Owing to this measure, since the image information A is exclusively reproduced on the recording paper, the consumption of the toner can be decreased and the appearance of the printed image can be improved as well.

An act of accurately masking the part of the film outside the border line E for the purpose of keeping the background part G of the film outside the border line E, however, is difficult to fulfil on account of the limitation imposed on the accuracy with which a masking device is positioned relative to the border line E. To overcome this difficulty, the accuracy with which the sensor serving the purpose of detecting the masking position must be improved to the order of microns. The concept of accurately masking the background part G of film is impracticable in the light of the cost of the photosensor itself and the increase of cost due to intrication of the control circuit part required for processing image information from the photosensor.

In an effort to realize the decrease of the consumption of the toner and the improvement of the print quality within the purview of practicability, an idea has been conceived to effect detection of the position of the edge of an image information frame by the use of a photosensor having light-receiving elements arrayed at intervals of mm. When the image in the image information frame is reproduced on the recording paper while the image to be reproduced is regulated with the masking device accurately to the detected position of the edge of the image information frame, there arises the possibility that the background part of the film will partially remain in the form of a rectangular frame in the reproduced image. The reason for this possibility is that the portion of the border line E illustrated in FIG. 15 deflects from the edge of the image information frame detected by the photosensor with a margin short of the detecting pitch of the photosensor. To ensure perfect prevention of the appearance of this rectangular frame in the image reproduced on the recording paper, it is necessary and sufficient to erase the relevant region by means of such a masking device as a shutter so that the external image inclusive of the margin short of the detecting pitch from the position at which the edge of the image is detected will not be reproduced. Where the information recorded is so expansive as to reach closely to the border line E of FIG. 15, however, there arises the possibility that the act of masking the film surface as far as the position inclusive of the aforementioned detecting pitch of the photosensor to attain perfect erasure of the rectangular frame will entail unwitting erasure of the recorded image information.

U.S. Pat. No. 4,839,696 discloses an invention for solving the problem described above by converting the image information detected with the photosensor into binary data and developing the binary data in the form of a matrix thereby allowing detection of the position of the border line E, namely the position of the rectangular frame, of the image information frame. Where the information is recorded so expansively as to reach closely to the border line E, the operator controls the operation of the apparatus so that the actual background part of the film will be partially formed on the recording paper, i.e. the background part of the film will be allowed to remain in the form of a frame and the recorded information will be reproduced safely in its complete form. Where the information is not recorded so expansively as to reach closely to the border line E, the idea of attaining perfect erasure of the background part of film surrounding the image by masking the film to the extent of even covering the edge of the image region has been put to trial.

Incidentally, the technique disclosed in the U.S. patent specification betrays inferior operability of the reader printer because it compels the operator to perform the key operation while keeping a constant watch on the image projected on the screen.

Further, the technique of this U.S. patent specification has the problem of entailing the possibility that since the detection of the contour portion of the image information frame or the position of the border line is attained by starting the detection of the image information frame from the edge part of the frame with the aforementioned photosensor, the detection of the range of the image to be reproduced on the recording paper will consume much time and the photosensor will produce an erroneous operation in the presence of a blip mark B or dust.

When the reader printer is used in copying an image recorded on the microfilm, generally the procedure which comprises first projecting recorded images one by one on the screen, retrieving the particular image desired to be copied, and thereafter starting the work of copying is employed more often than not. It naturally follows that the image retrieved and readied for copying is positioned in the central part of the screen by the operator's control of the operation of the reader printer. When the copying work is started in the ensuant state of the reader printer, the recorded image is scanned against the photosensitive element.

SUMMARY OF THE INVENTION

An object of this invention is to provide an image forming apparatus which is capable of developing the information formed in an image information frame on a microfilm in the form of a matrix and, based on the matrix of data, effecting automatic control of the range of control of the range of the image to be reproduced on a recording paper.

Another object of this invention is to provide an image forming apparatus which is capable of enabling image information such as of letters within an image information frame to be infallibly reproduced on a recording paper and ensuring production of a printed image of highly satisfactory appearance and quality and allowing a decrease in the consumption of toner.

Yet another object of this invention is to provide an image forming apparatus which, by starting the detection of the range of an image to be copied from the part thereof corresponding to the central part of the screen, enables erasure of the part unnecessary for reproduction, namely the erasure of the rectangular frame to be effected quickly and efficiently and infallibly without entailing any erroneous operation.

In accordance with the present invention, there is provided a microfilm printer, comprising projecting means for projecting an image information frame recorded on a microfilm, image forming means for reproducing a projected image information on a recording medium, light receiving means for receiving a projected light and emitting signals in response thereto, regulating means for intercepting the light projected from the projecting means, and controlling means for making decision as to whether or not image information is present within the range of a prescribed width inwardly of the edge of the image information frame based on the signals received from the light receiving means and, when the presence of image information within the range is detected, controlling the regulating means so as to intercept the projected light falling outside the edge and, when the absence of the image information is confirmed, controlling the regulating means so as to intercept the projected light directed to the region outside the edge and the region within the range of the prescribed width.

BRIEF DESCRIPTION OF THE DRAWINGS

FIG. 3 is a side view illustrating drive means for actuating the whole shutter.

FIG. 4 is a perspective view illustrating drive means for actuating the side shutter.

FIG. 7 (A) and FIG. 7 (B) are each a map showing the relation between an image projected on a screen and a binary information obtained from the photosensor.

DESCRIPTION OF THE PREFERRED EMBODIMENTS

Figure 1:
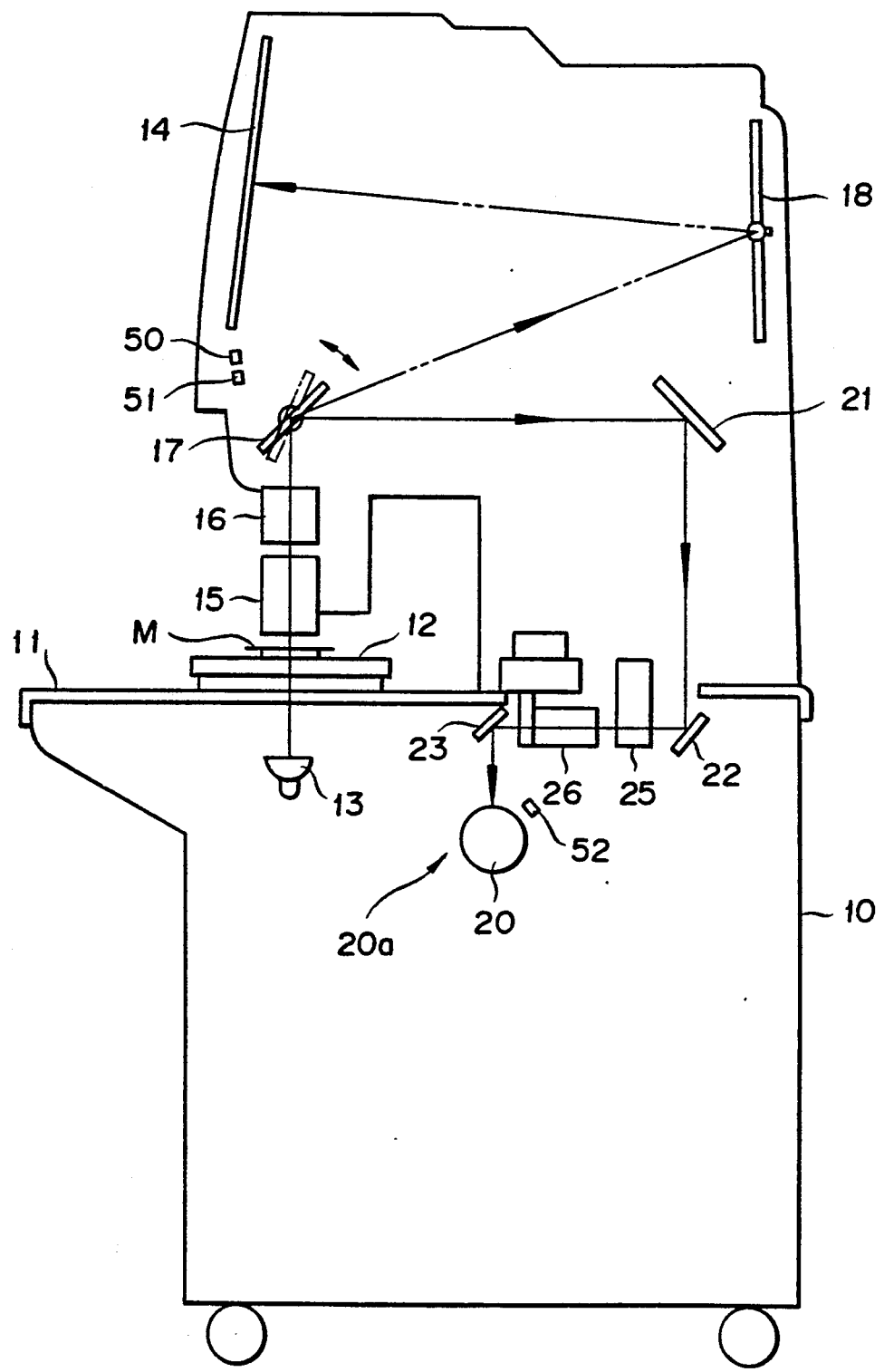
FIG. 1 is a lateral-side cross section illustrating the internal structure of a typical reader printer in one embodiment of the present invention.

A table 11 set in place in a housing 10 of a reader printer is provided with a film carrier 12 as illustrated in FIG. 1. This carrier 12 is furnished with a mounting region 12a made of a transparent material such as glass and this mounting region 12a is adapted so that a microfilm M may be mounted thereon. The housing 10 has a built-in light source 13. The light emitted from this light source 13 and passed through the microfilm M is caused to impinge on a screen 14 disposed on the upper front side of the housing 10. A projecting lens 15 is disposed above the carrier 12. Above the projecting lens 15 is disposed a prism 16 for vertically inverting an image passed through the projecting lens 15. A scanning mirror 17 adapted to be freely rotated in the direction indicated by an arrow is disposed above the prism 16. The scanning mirror 17 serves the purpose of switching a reader light path and a printer light path and, at the same time, scanning the image on the microfilm M in the process of printing. Inside the reader light path, a reflecting mirror 18 is fixed so as to cause the image reflected by this scanning mirror 17 to be reflected in the direction of the screen 14.

Between a photosensitive drum 20 for copying the image of the microfilm M on a recording paper and the aforementioned scanning mirror 17, reflecting mirrors 21, 22, and 23 which are components of the printer light path are set in place. Around this photosensitive drum 20, a well-known electrophotographic image forming part is set in place, though not shown in the diagram. The photosensitive drum 20 itself constitutes part of the image forming part 20a.

In the reader printer of the construction described above, in order for the image recorded on the microfilm M to be projected on the screen 14, it is necessary that the scanning mirror 17 should be rotated to the position of the reader light path. As a result, the light from the light source 13 impinges on the microfilm M on the mounting region 12a and causes the image recorded on the film to be projected on the screen 14 via the projecting leans 15, the prism 16, the scanning mirror 17, and the reflecting mirror 18.

For the image projected on the screen 14 and then inspected to be printed on the recording paper 19, the scanning mirror 17 is switched to the printer light path. As a result, the image on the microfilm M irradiated by the light from the light source 13 is projected on the photosensitive drum 20 via the projecting lens 15, the prism 16, the scanning mirror 17, and the mirrors 21 to 23. In this case, the scanning mirror 17 is rotated synchronously with the rotation of the photosensitive drum 20 to project a slit of light on the photosensitive drum 20.

A whole shutter 25 and a side shutter 26 are disposed in the printer light path between the aforementioned two mirrors 22 and 23 in such a manner that the part of the slit of light from the microfilm M containing the recorded negative image which is not wanted for the reproduction of an image on the recording paper 19, specifically the part of the slit of light passing through the mark for detection such as a blip mark or a document mark, may be prevented from impinging on the photosensitive drum 20.

The whole shutter 25 is illustrated in detail in FIG. 3. A fitting member 30 fixed in place in the housing 10 is provided with a supporting shaft 31 extended in the direction parallel to the axis of rotation of the photosensitive drum 20 relative to the slit of light. To the supporting shaft 31, a shutter vane 32 is attached rotatable around it. This supporting shaft 31 perpendicularly intersects the optical axis 0 of the slit of light illustrated in FIG. 3. The shutter vane 32 comprises a basal end part 32a and a shielding part 32b bent at the leading end thereof. The shielding part 32b has a width in the vertical direction in the bearings of FIG. 3 enough to allow complete interception of the projected light path and a length in the direction perpendicular to the plane of the diagram.

In order for the shutter vane 32 to be rotated and set selectively at the intercepting position indicated with a continuous line in the diagram and the retracting position indicated with a two-dot chain line, a plunger 34 of an electromagnetic actuator 33 fixed on the fitting member 30 is meshed with a bracket 35 attached fast to the shutter vane 32. When the power line to the electromagnetic actuator 33 is closed, the plunger 34 is retracted and the shutter vene 32 is moved to the retracting position. When the power line is opened, the shutter vane 32 is caused to set the intercepting position.

Figure 2:
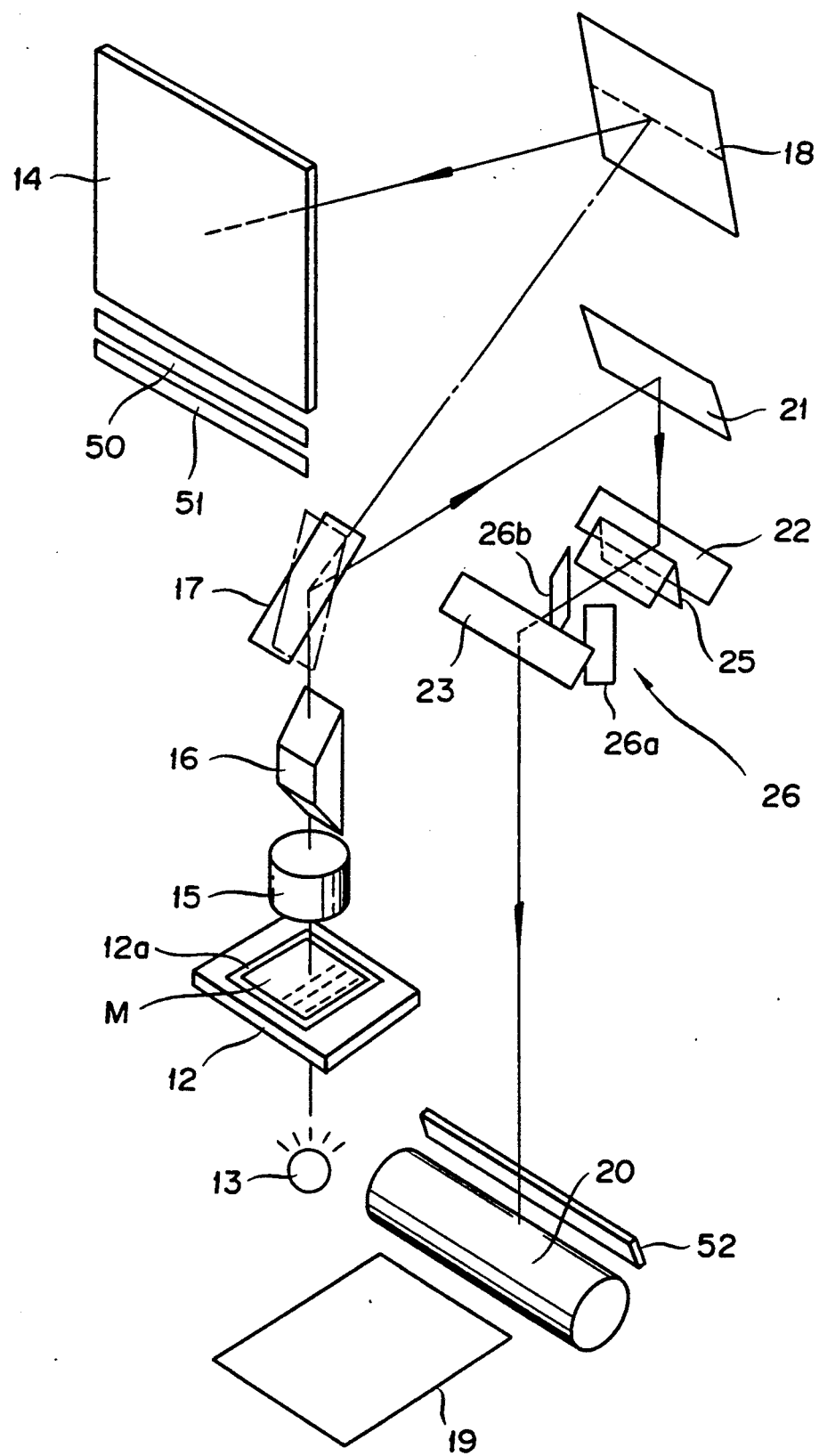
FIG. 2 is an exploded perspective view illustrating an optical system of the reader printer shown in FIG. 1.

The side shutter 26 is provided with two shutter vanes 26a, 26b adapted to intercept the parts of the slit of light corresponding to the opposite terminal parts of the photosensitive drum 20 as illustrated in FIG. 2. One of these shutter vanes is illustrated in detail in FIG. 4.

To a rotary shaft 40 set in place rotatable inside the housing 10, the shutter vane 26a is attached fast. For the purpose of driving the rotary shaft 40, a semicircular toothed wheel 42 which is fitted to one end of the rotary shaft 40 is meshed with a toothed wheel 44 set in place inside the housing 10 and adapted to be rotated with a stepping motor 43. To the rotary shaft 40, an operating member 45 is attached fast in phase with the shutter vane 26a. When the shutter vane 26a is caused to move to the standard position A indicated with a two-dot chain line in consequence of the rotation of the rotary shaft 40, the leading end of the operating member 45 enters the interior of the slit part of a position detector 46 which is provided with a photoelectric detecting element. The signal consequently emitted by the position detector 46 permits detection of the fact that the shutter vane 26a has moved to the standard position.

Figure 5:
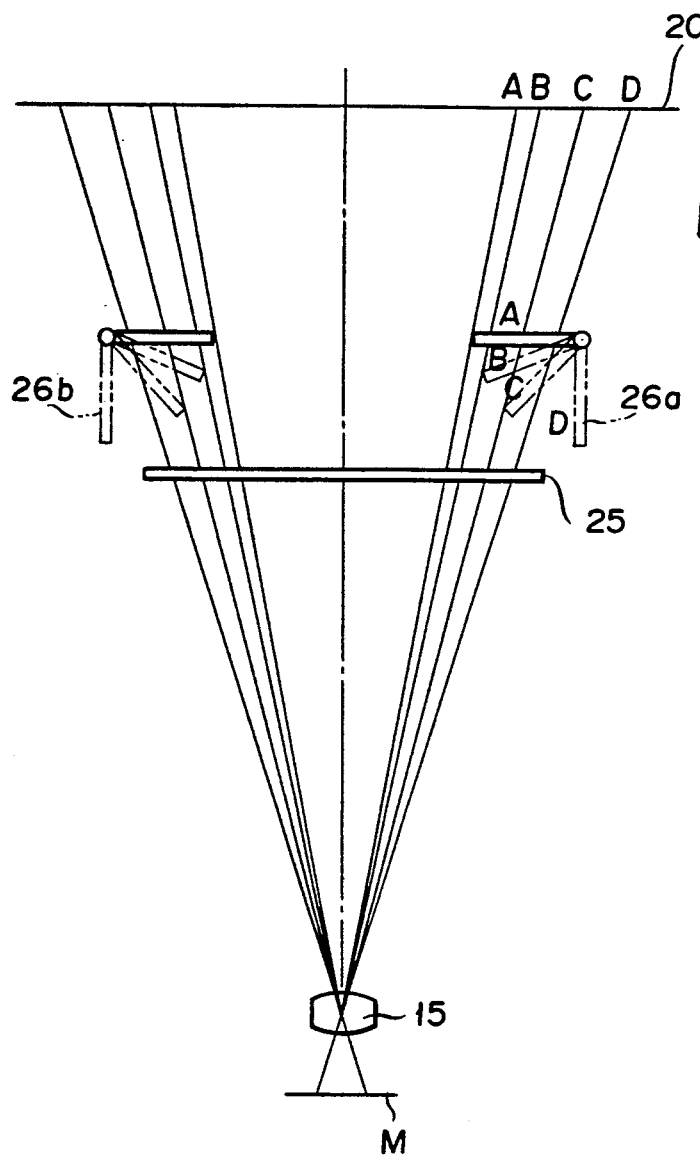
FIG. 5 is a schematic diagram illustrating the relation of the between the shutters and the printer light path.

FIG. 5 is a diagram typically illustrating the operating condition of the whole shutter 25 and the side shutter 26 mentioned above. By the operation of the whole shutter 25, the slit of light is selectively intercepted. By the rotation of the shutter vanes 26a, 26b of the side shutter 26, the region permitting the advance of the slit of light is controlled. The positions at which the slit of light reaches the photosensitive drum 20 corresponding to the rotated positions A to D of the shutter plate 26a are indicated by like symbols.

As illustrated in FIG. 1, a photosensor, specifically an automatic masking sensor (AM sensor) 50, is disposed directly below the screen 14. This photosensor 50 possesses a length substantially equal to the lateral width of the screen 14 as shown in FIG. 2. Directly below this photosensor 50, an image density detecting sensor (AE sensor) 51 for detecting the density of a given original image is disposed for the purpose of controlling the illuminance of the light used for exposure.

An eraser LED 52 for erasing the part of an image information frame on a positive film not wanted for printing is disposed as juxtaposed to the photosensitive drum 20. This LED 52, therefore, constitutes itself control means for regulating the image forming region relative to a positive film.

Figure 6:
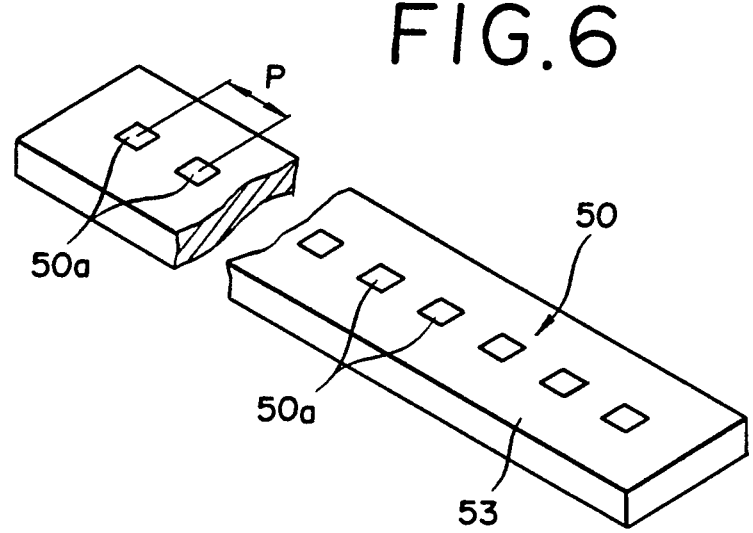
FIG. 6 is a partially omitted perspective view illustrating a photosensor.

FIG. 6 is a diagram illustrating part of the photosensor 50. On a base plate 53, a total of 24 light receiving elements 50a each formed of a photodiode, for example, are arrayed linearly at a fixed pitch P, specifically 6 mm in the illustrated embodiment. The photosensor 50 is scanned and allowed to receive the projected image while the reader light path is being switched to the print light path by the scanning mirror 17. The individual light receiving elements 50a issue analog signals in response to the intensities of the received light. The CPU converts the data of analog signals into binary data. No matter whether the loaded microfilm M is a negative film or a positive film, the binary data are developed in the form of an imaginary matrix, with a black image forming part represented by a signal "1" and a white image forming part by a signal "0" within a memory.

Owing to the use of this photosensor 50, by rotating the scanning mirror 17 illustrated in FIG. 1 and FIG. 2 before reproducing the image on the recording paper 19 through the medium of the photosensitive drum 20, only the part of the image recorded on the microfilm M which is found to be necessary for reproduction on the recording paper through the discrimination of the position of the boundary between the background part and the image information frame of the microfilm M is detected.

Figures 7A, 7B:
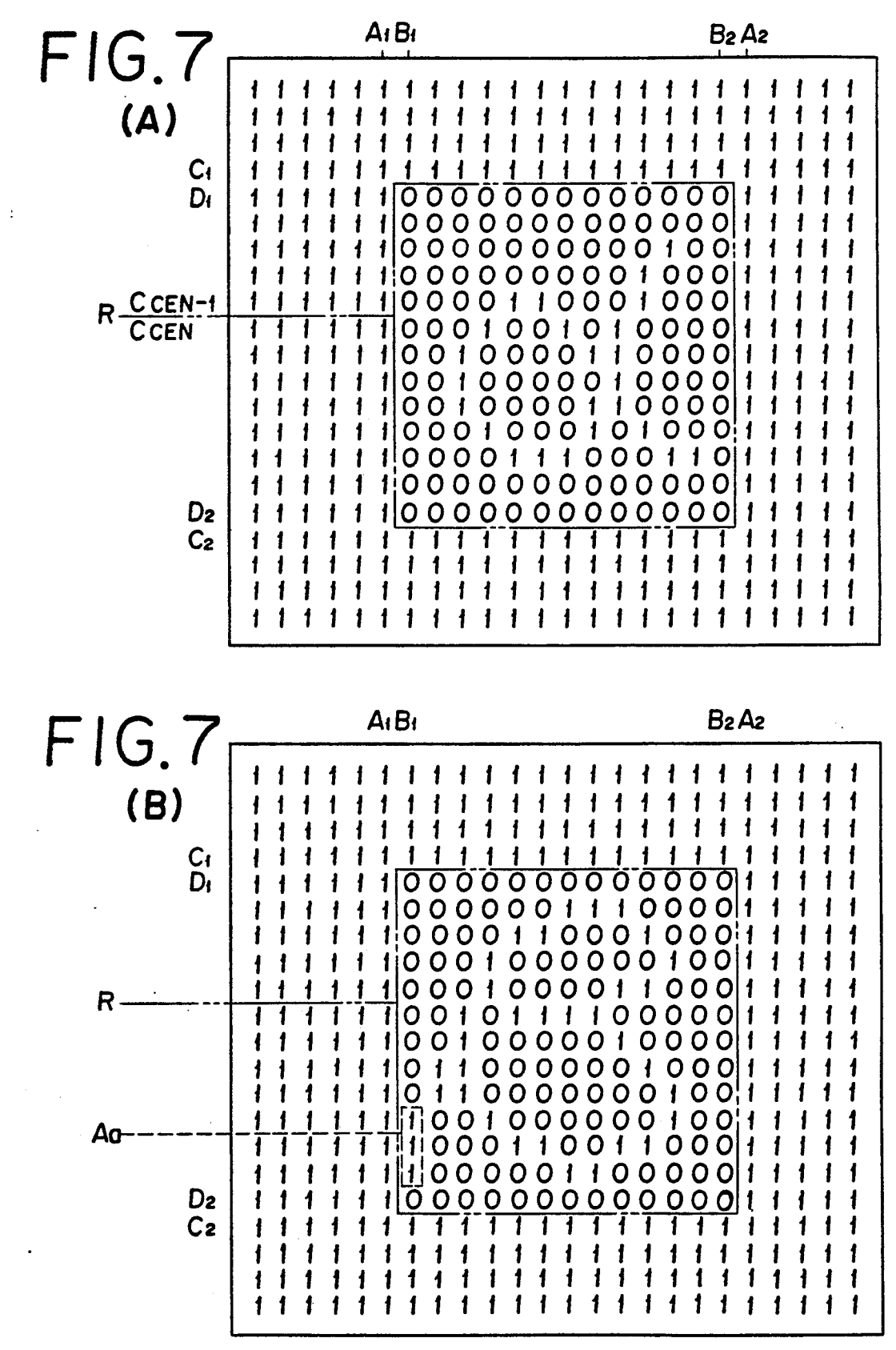

FIG. 7 (A) and (B) are diagrams each produced by an operation in which the photosensor 50 receives one after another of the scanned lines of an image projected on the screen from the microfilm M containing recorded negative images and the CPU converts the corresponding data from the photosensor 50 into binary data and arrays the binary data in the form of a matrix representing a map showing an overall image density as distributed in the entire region of the screen 14. In the illustrated embodiment, the map is composed of 21 horizontal lines and 24 vertical rows. In the diagrams, "1" stands for a bright part (transparent part of film) and "0" for a dark (black) part appearing in white. In the present case, therefore, the portion enclosed with a two-dot chain line R represents a region to be reproduced on the recording paper or the region in which the photosensitive drum 20 is exposed to light.

Figure 15:
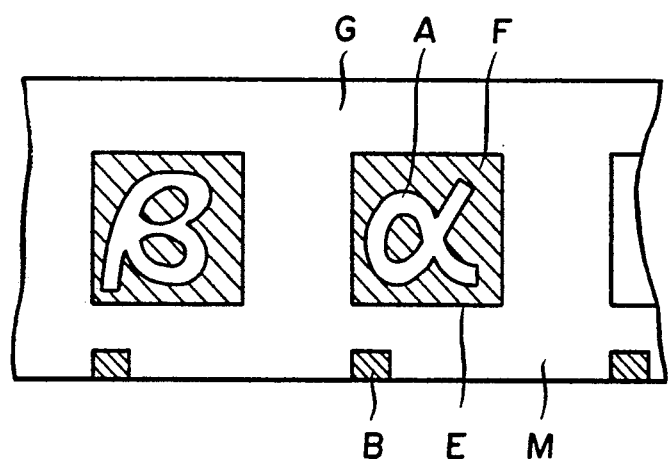
FIG. 15 is a plan view illustrating part of a microfilm having negative images recorded thereon.

In the microfilm illustrated in FIG. 7 (A), it is clearly noted from the image data that no image information is recorded in the portion of the image information frame approximating the border line. In the microfilm illustrated in FIG. 7 (B), an image information Aa is recorded in the portion of the image information frame approximating the border line. When the information within the image information frame illustrated in FIG. 7 (A) is to be reproduced on the recording paper 19, therefore, since the microfilm is a negative film in this case, by masking the film as far as the lines D1 and D2 falling further inwardly than the lines C1 and C2 corresponding to the edges of the image information frame and similarly as far as the rows B1 and B2 falling further inwardly than the rows A and A2 by the use of the whole shutter 25 and the side shutter 26, the edge portion of the image information frame is not reproduced in the form a frame but the recorded image information is exclusively reproduced on the recording paper. The film is masked as far as the edge portion of the interior of the image information frame to limit the image to be reproduced when no image information is recorded in the portion of the image information frame approximating the border line as described above. The reason for this limitation of the image reproduction is that there exists the possibility of the line E shown in FIG. 15, i.e. the actual border line, falling somewhere between the line C1 detected by the light receiving elements of the photosensor 50 or the edge portion of the image information frame and the line D1 or the portion of the image information frame approximating the border line.

In contrast, in case where the image information in the image information frame illustrated in FIG. 7 (B) is to be reproduced, if the film is masked as far as the lines D1 and D2 corresponding to the portions of the image information frame approximating the border line and similarly as far as the rows B1 and B2 in the same manner as in FIG. 7 (A), there exists the possibility that the image information recorded in the portions of the image information frame approximating the border line and consequently detected by the light receiving elements 50a of the photosensor 50 will be erased. When the photosensor 50 detects the fact that image information is recorded in the portions of the image information frame approximating the border line, the part of the film falling outside the image information frame but including the edge of this frame detected by the photosensor is masked. In other words, when image information Aa is recorded in the portion of the row B1 corresponding to the portion of the image information frame approximating the border line, the part of the film falling outside the image information frame and including the row A1 and not including the row B1 is erased. The masking shutters 25, 26 have their working positions set as separated by the same pitch as the light receiving elements.

As a result, the image information recorded within the image information frame is infallibly reproduced on the recording paper. When no image information is recorded in the position of the image information frame approximating the border line, the part solely of image information is exclusively reproduced automatically to allow a saving in the amount of toner to be consumed.

Figure 8:
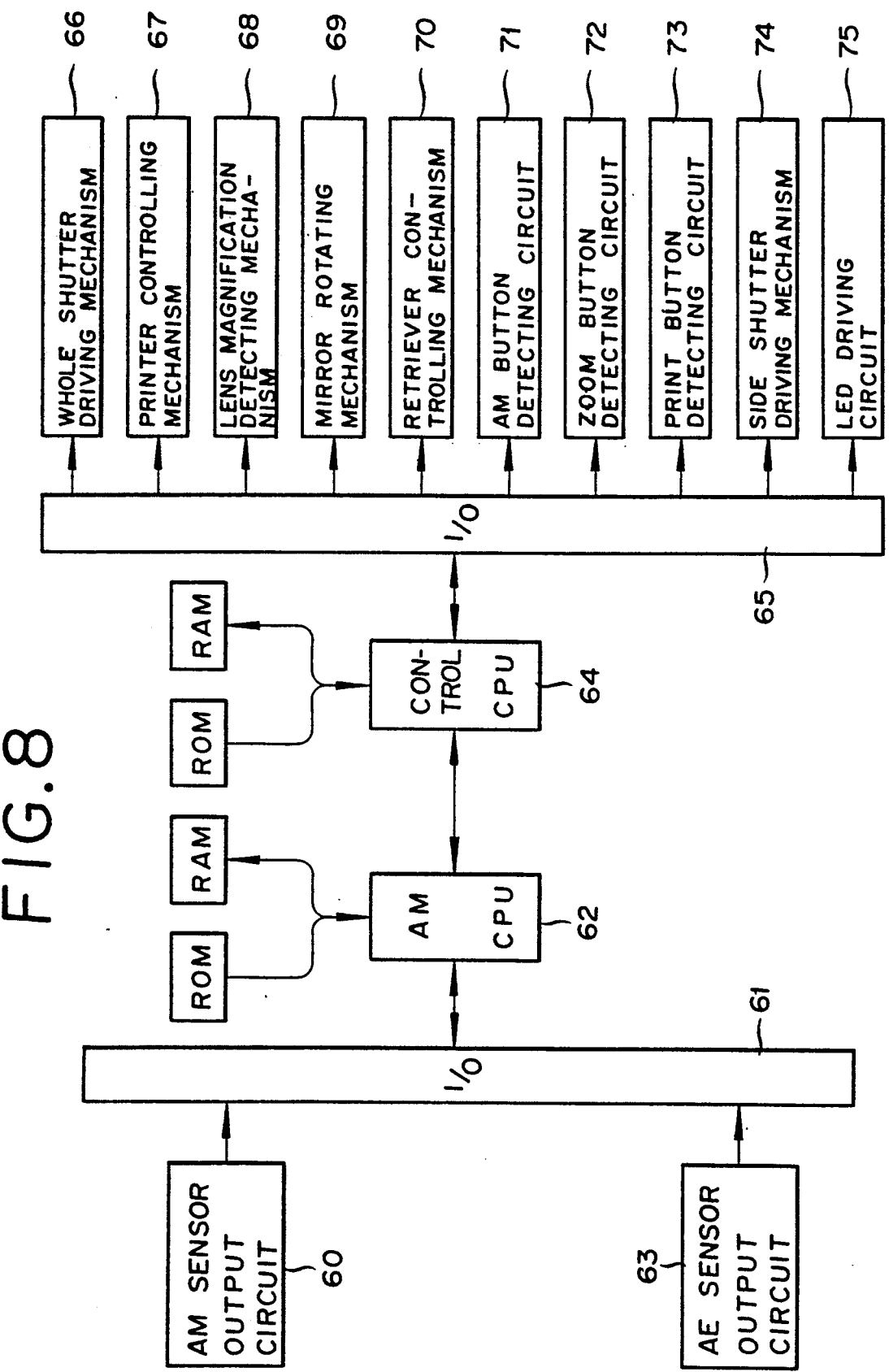
FIG. 8 is a block diagram illustrating a control circuit of the present invention.

FIG. 8 is a diagram illustrating a control circuit to be used in the present reader printer. The signals from the component detecting elements 50a of the photosensor 50 are forwarded to an AM sensor output circuit 60, amplified by an amplifier incorporated in the AM sensor output circuit 60, and delivered to an input/output port 61. An A/D converter incorporated in the input/output port 61 digitizes the analog signals from the photosensor 50 and forwards the digit data to an AM CPU 62. The signals from an image density detecting sensor 51 are similarly forwarded via an AE sensor output circuit 63 to the CPU 62. The data from the photosensor 50, now converted in the binary form, are stored in a RAM as a memory medium.

A control CPU 64 connected to the AM CPU 62 forward relevant control signals via an input/output port 65 to a whole shutter driving mechanism 66, a printer controlling mechanism 67, a lens magnification detecting mechanism 68, a mirror rotating mechanism 69, a retriever controlling mechanism 70, an AM button detecting circuit 71, a zoom button detecting circuit 72, a print button detecting circuit 73, a side shutter driving mechanism 74, and an LED driving circuit 75.

Now, the operating procedure of the aforementioned reader printer will be described below with reference to the flow charts of FIG. 9 to FIG. 12.

When the start of printing is detected at Step 80, the data from the light receiving elements 50a are fed in by the photosensor 50 at Step 81. The thresholds for discrimination between white and black of the received light are calculated at Step 82 and the image data are converted into binary data at Step 83.

Based on the binary data consequently obtained, the positions of the upper and lower frames, the positions of C1 and C2 in the diagrams of FIGS. 17 (A) and (B), namely the positions of the edges of the image information frame, are detected at Step 84 and the positions of the left and right frames, the positions of A1 and A2 in the present case, namely the positions of the edges of the image information frame are detected at Step 85. Further at Step 86, the question as to whether or not image information is recorded in the portion of the image information frame approximating the border line, namely the edge condition of image, is decided. Based on the information concerning the positions of the edges of the image information frame detected as described above and the result of the decision as to whether or not image information is recorded in the portion of the image information frame approximating the border line, the portion not required to be reproduced on the recording paper is erased and the printing operation is performed as illustrated at Step 87.

The erasure of the unwanted portion, in case where a microfilm having negative images recorded thereon is loaded in the reader printer, is accomplished by an operation in which the aforementioned side shutters 26 shield the left and right edge portions of the projected image and the whole shutter 25 is opened or shut suitably to shield the upper and lower edge portions of the projected image while the slit of light scan the edge portions, thus masking the film accordingly.

In case where a microfilm having positive images recorded thereon is loaded in the reader printer, the part of the latent image formed on the photosensitive drum 20 correspondingly to the part of the microfilm not wanted to be reproduced on the recording paper, specifically the blip mark or document mark formed in the margin outside the image information frame of the microfilm, is irradiated with the beams of light from the LED 52 illustrated in FIG. 1 and FIG. 2 to relieve the part of its electric charge. In other words, the LED 52 are wholly lit on against the part of lines not wanted to be reproduced and only the LED's corresponding to the part of rows not wanted to be reproduced are lit on.

Figure 9:
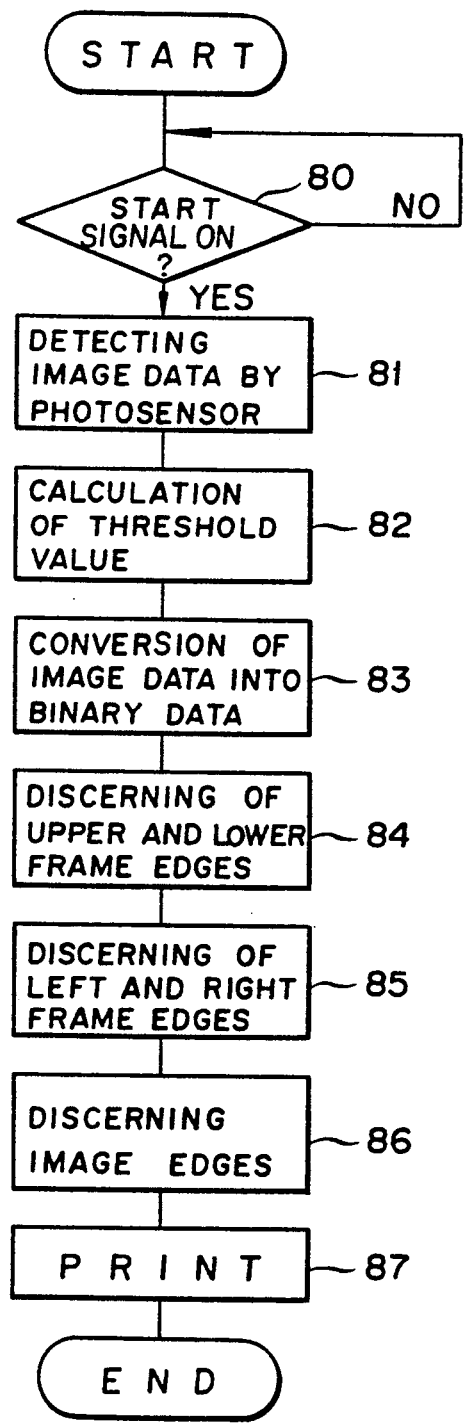
FIG. 9 is a main flow chart illustrating control steps of the present invention.
Figure 10:
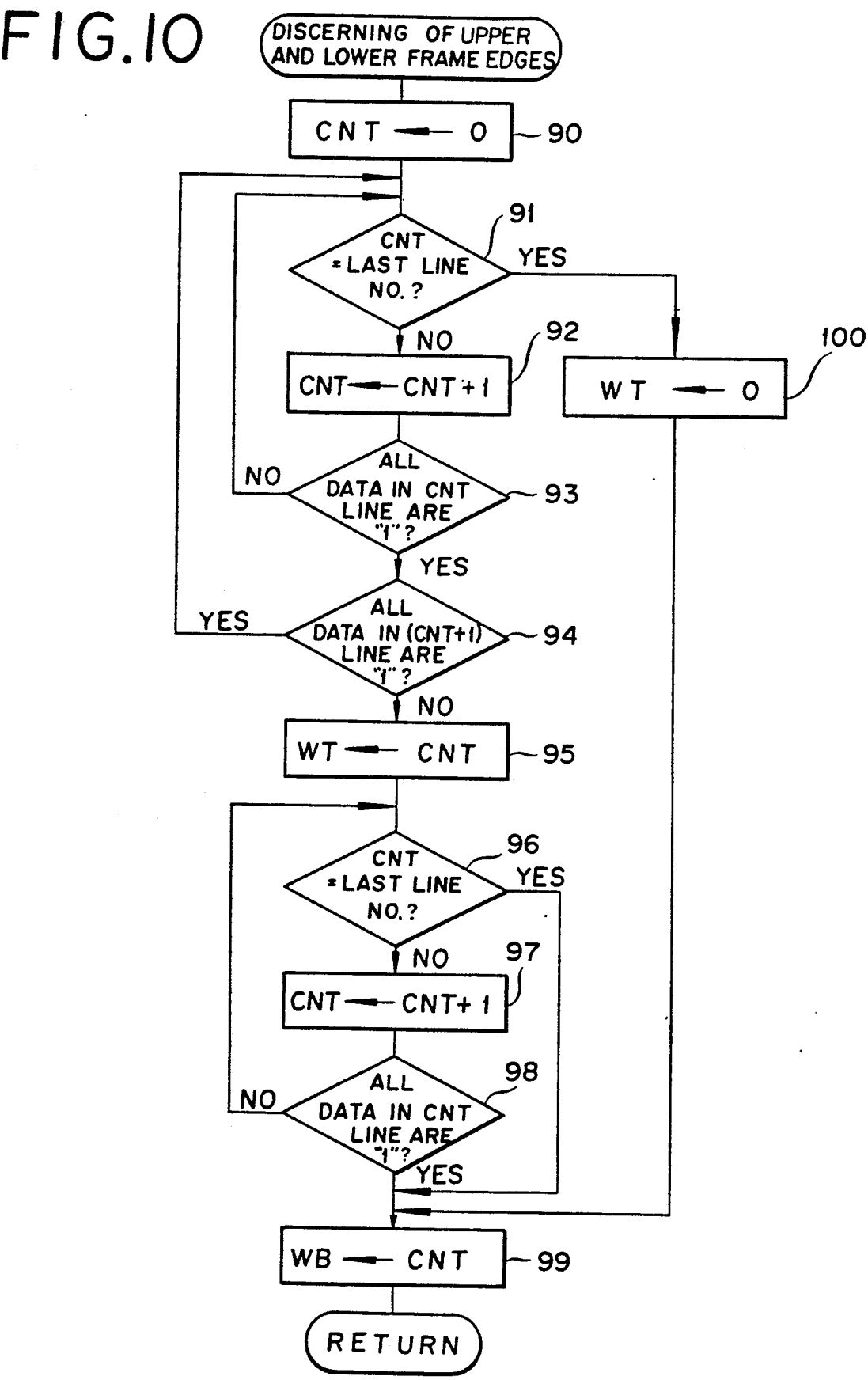
FIG. 10 is a flow chart illustrating a subroutine of upper-lower frame discriminating steps shown in FIG. 9.

FIG. 10 is a diagram showing a subroutine for discerning the upper and lower frames, namely the upper and parts of the contour region of the film, indicated at Step 84 in FIG. 9. At Step 90, the numeral in a counter CNT for counting the number of lines is reset to 0. By executing Steps 91 to 94 detecting the image of binary data downwardly from the uppermost line, the address of a line containing exclusively "1" or bright spots of projected image and followed by a line containing absolutely no "1" is searched out. This line, in the case of the diagrams of FIGS. 7 (A) and (B), corresponds to the edge portion of the image information frame indicated as line C1. The numerical value of this line C1 is memorized as an address WT of the upper frame at Step 95. When YES is given as an answer at Step 91, 0 is fed as the value of the address. Then, the position of the lower frame is found by executing Steps 96 to 98 thereby searching for the address of the first line containing exclusively "1" and setting the value of this address the address of the lower frame at Step 99.

Figure 11:
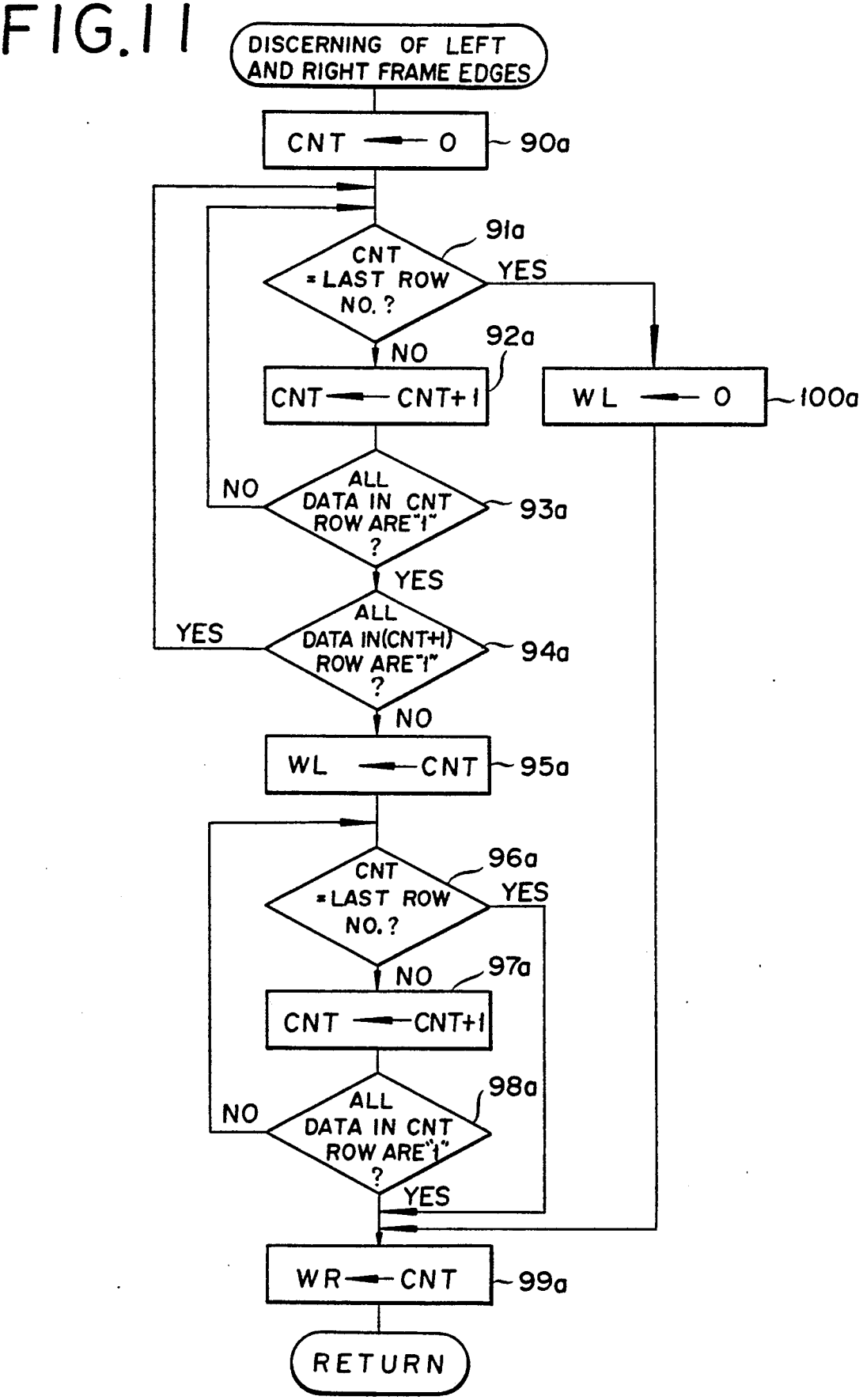
FIG. 11 is a flow chart illustrating a subroutine of left-right frame discriminating steps shown in FIG. 9.

By the steps shown in FIG. 11 similarly to those described above, the image of binary data is detected laterally from the leftmost row illustrated in FIGS. 7 (A) and (B) to search out the positions of the edges of the image information frame, namely the portions of the left and right frames. In FIG. 11, the parts of procedure having likes found in FIG. 10 are noted by like step numbers suffixed by a.

Figure 12:
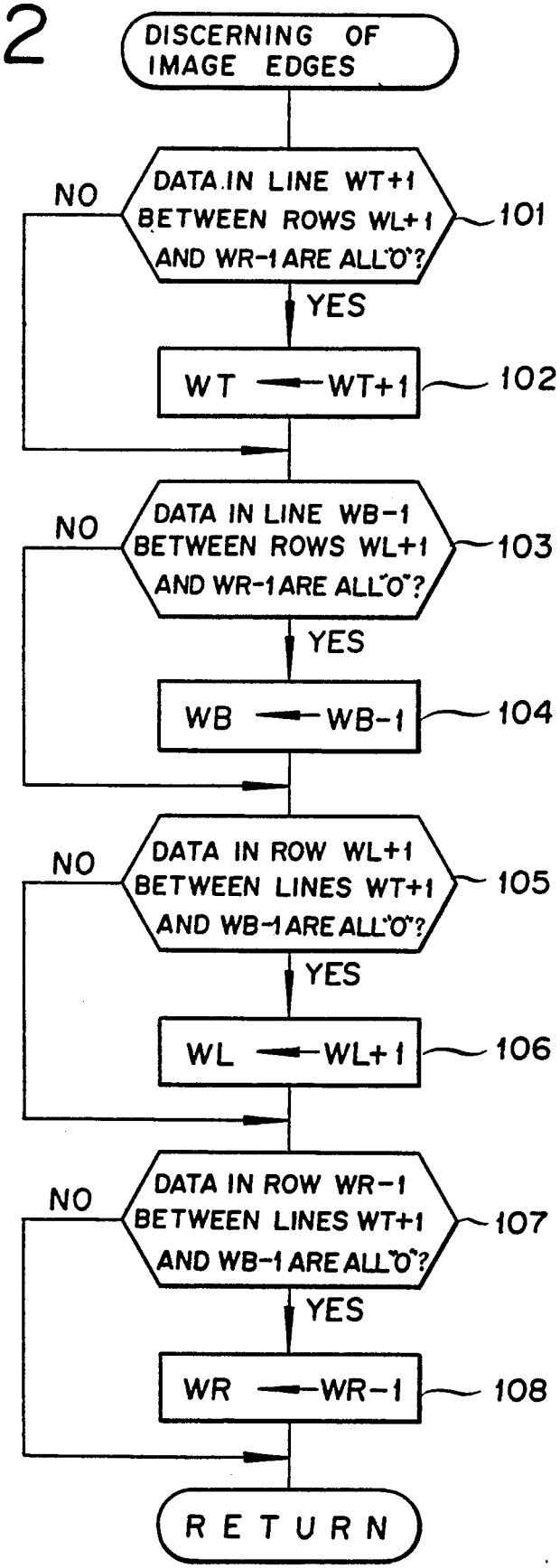
FIG. 12 is a flow chart illustrating a subroutine of image end discriminating steps shown in FIG. 9.

FIG. 12 is a diagram illustrating a subroutine for discerning the image edges indicated at Step 86 of FIG. 9.

First at Step 101, the question as to whether or not the data of 0 is present in the line WT+1 next below the aforementioned upper frame address WT between the row next to the left frame address WL and the row immediately preceding the right frame address WR is decided. With reference to the diagrams of FIGS. 7 (A) and (B), the question as to whether or not data information is recorded in the portion of the image information frame approximating the border line, specifically in the line D1 between the rows B1 and B2 is decided. When no image information is recorded in the portion mentioned above, "YES" is drawn as an answer at Step 101 to correct the value of the upper frame address found at Step 95 by one line taken in the inward side. As a result, the edge portion of the image information frame is not reproduced at all on the recording paper. When image information is recorded in the portion in question, the recorded image is reproduced without any correction in the upper frame address value WT. In this case, since the limitation of image reproduction is effected only as far as the portion of the address value WT, there arises the possibility that the background part of the film will be partially reproduced, depending on the edge of the image information frame detected and the position of the actual border line surrounding the image information frame. There is absolutely no possibility of the recorded image information being erased.

Similarly at Steps 103 and 104, the question as to whether or not image information is recorded in the portion of the image information frame approximating the lower border line, namely in line D2. When "YES" is drawn as an answer, the value WB of the lower frame address is corrected on the inward side, is decided. At Steps 105 and 107, the decision as to whether or not image information is recorded in the portion of the image information frame approximating the border line. When "YES" is drawn as an answer, the left frame address WL is corrected at Step 106 and the right frame address WR is corrected at Step 108.

The pitch P for spacing the light receiving elements 50a of the photosensor 50 may be freely set, even on the order of several mm. In this case, the light receiving element one pitch next to the light receiving element corresponding to the detected edge of the image information frame may be discerned as the portion of the image information frame approximating the border line. When the presence or absence of image information is to be as far as the extreme positions of the image information within the image information frame taken as the edge thereof, the elements falling at least two pitches inwardly from the edges may be used for the decision as to whether or not image information is present in the image information frame approximating the border line, depending on the accuracy of means of controlling the image forming region or the masking region. In other words, the edges of the image information frame detectable with the light receiving elements of the photosensor, the positions of the portions of the image information frame approximating the border line, and the pitches separating the light receiving elements can be freely set.

Now, the procedure for control of another reader printer as another embodiment of this invention will be described below.

In this case, the positions of the upper and lower frames, namely the portions of the background part of the microfilm M closest to the recorded image which are required to be erased, specifically the portions of lines C1 and C2 in the diagrams of FIG. 7, are to be detected on the basis of the data received by the photosensor 50 and converted into binary data. In the present embodiment, the search for the positions of the upper and lower frames is started from the central line C-cen. For the detection of the positions of the left and right frames, specifically the rows A1 and A2 in the illustrated embodiment, the search for the positions of the left and right frames is started from the central row A-cen. Since the search of the image projected on the screen 14 and then transferred onto the photosensitive drum 20 for the part which is required to be reproduced on the recording paper is started from the central part of the image, the erasure of the surplus of image can be effected rapidly and efficiently.

Now, the control process involved in the present embodiment will be described below with a flow chart. The flow chart in this case is identical with the main flow chart of the preceding embodiment illustrated in FIG. 9, excepting Step 86 is omitted.

Figure 13:
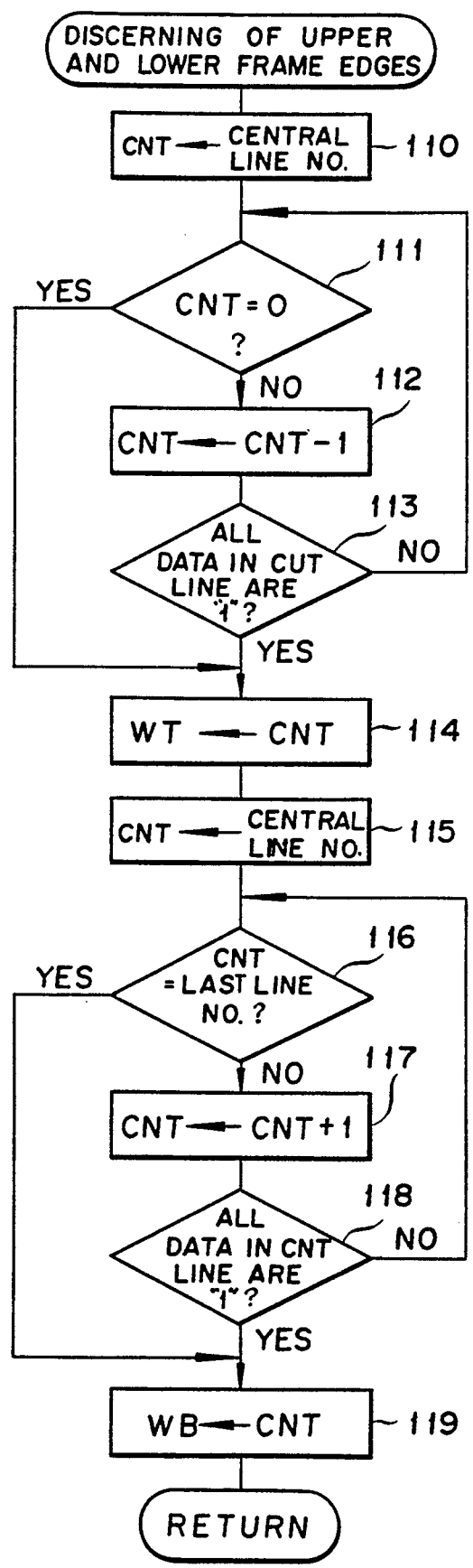
FIG. 13 is a flow chart illustrating a subroutine of upper-lower discriminating steps involved in another embodiment of the present invention.

FIG. 13 is a diagram illustrating the subroutine for discerning the upper and lower frames in the present embodiment. At Step 110, the serial number of the central line, specifically that of the central line C-cen in the diagram of FIG. 7, is supplied to the counter CNT and the upper side lines are sequentially searched through Steps 111 and 112 to detect a line exclusively containing "1" or black spots, specifically the line C1 in the case of FIG. 7, and the serial number of this line is stored in the upper frame address WT. Similarly, in Steps 115 to 119, the count value C2 in the lower frame address WB is stored in the RAM.

Figure 14:
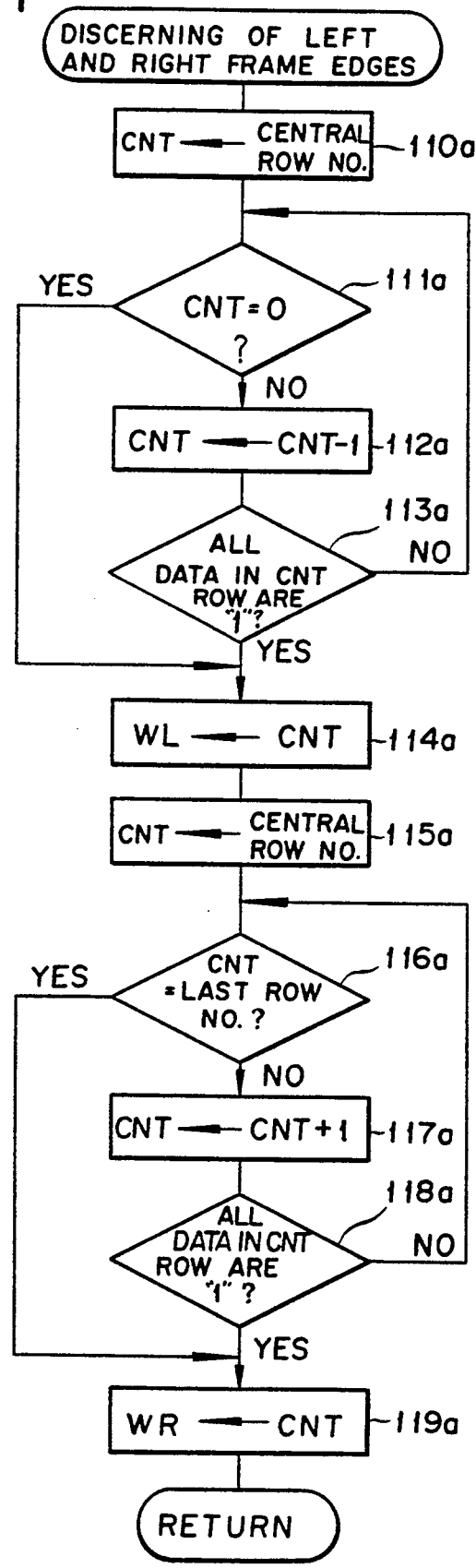
FIG. 14 is a flow chart illustrating a subroutine of left-right frame discriminating steps involved in yet another embodiment of the present invention.

FIG. 14 is a diagram illustrating a subroutine for discerning the left and right frames in the present embodiment. In the same manner as the upper and lower frames are discerned in the embodiment of FIG. 13, the rows A1 and A2 constituting the left and right frames illustrated in FIG. 7 are detected. In FIG. 14, the steps which find like steps in FIG. 13 are denoted by like symbols suffixed by a. In FIG. 14, WL stands for the address of the position of the left frame and WR for the address of the position of the right frame.

In any of the preceding embodiments, the position of the photosensor namely the AM sensor 50 is not limited to that which is directly below the screen 14 as illustrated in the diagram but may be freely selected in the reader light path or the print light path so long as it falls behind the scanning mirror 16.

What is claimed is:

1. A microfilm printer, comprising:
    projecting means for projecting an image information frame recorded on a microfilm;
    image forming means for reproducing a projected image information on a recording medium;
    light receiving means for receiving a projected light and emitting signals in response thereto:
    regulating means for intercepting the light projected from said projecting means; and
    controlling means for making decision as to whether or not image information is present within the range of a prescribed width inwardly of the edge of the image information frame based on the signals received from said light receiving means and, when the presence of image information within the range is detected, controlling said regulating means so as to intercept the projected light falling outside the edge and, when the absence of the image information is confirmed, controlling said regulating means so as to intercept the projected light directed to the region outside the edge and the region within the range of the prescribed width.

2. A microfilm printer according to claim 1, which further comprises a screen on which the image on the microfilm is projected and switching means for switching the projected light between first light path for projecting the image on said microfilm onto said screen and a second light path for projecting the image on said image forming means.

3. A microfilm printer according to claim 2, wherein said light receiving means serves the purpose of receiving the light projected while the projected light is being switched between the first light path and the second light path.

4. A microfilm printer, comprising:
    projecting means for projecting an image information frame recorded on a microfilm;
    image forming means for electrophotographically reproducing the projected image information on a recording medium:
    light receiving means for receiving projected light and emitting signals in response thereto:
    regulating means for erasing an electrically formed latent image; and
    controlling means for making decision as to whether or not image information is present within the range of a prescribed width inwardly of the edge of the image information frame based on the signals from said light receiving means and, when the presence of the image information within the range is confirmed, controlling said regulating means so as to erase the latent image outside the edge and, when the absence of said image information is confirmed, controlling said regulating means so as to erase the latent image falling outside said edge and within said range of prescribed width.

5. A microfilm printer according to claim 4, which further comprises a screen on which the image on the microfilm is projected and switching means for switching the projected light between first light path for projecting the image on the microfilm onto said screen and a second light path for projecting said image on said image forming means.

6. A microfilm printer according to claim 5, wherein said light receiving means serves the purpose of receiving the light projected while the projected light is being switched between the first light path and the second light path.

7. A microfilm printer, comprising:
    projecting means for projecting an image information frame recorded on a microfilm:
    image forming means for reproducing a projected image on a recording medium;
    optical means for guiding said image projected by said projecting means to said image forming means;
    detecting means for screening the image projected in response to the projected light outwardly from the central part thereof and emitting corresponding signals:
    discerning means for discerning the boundary between the image and the margin based on the signals from said detecting means:
    regulating means for limiting the region of image to be reproduced on said recording medium so as not to preclude reproduction of the part of the film outside the desired region; and
    controlling means for controlling said regulating means so as to preclude reproduction of the margin on said recording medium.

8. A microfilm printer according to claim 7, which further comprises a screen on which the image on the microfilm is projected and switching means for switching the projected light between first light path for projecting the image on the microfilm onto said screen and a second light path for projecting said image on said image forming means.

9. A microfilm printer according to claim 8, wherein said detecting means serves to receive light while the projected light is switched between the first light path and the second light path.

10. A microfilm printer according to claim 7, wherein said discerning means further serves the purpose of discerning as to whether or not image information is present within the range of a prescribed width inwardly of the border line already discerned and said controlling means controls said regulating means so as to prohibit reproduction of the margin when the presence of the image information within the range is confirmed and controlling said regulating means so as to limit the reproduction of the margin and the range of the prescribed width when the absence of the image information within the range is confirmed.

11. A microfilm printer, comprising:
    projecting means possessing a light source and projecting an image information recorded on a microfilm;
    image forming means for reproducing a projected image information on a recording medium;
    optical means for guiding the image information projected by said projecting means to said image forming means;

detecting means for receiving a projected light and emitting corresponding signals:

memory means for storing said signals from said detecting means;

discerning means for discerning the boundary between the region of image information and the margin based on the information memorized by said memory means and reading out of said memory means the information of projected image sequentially outwardly from the central part thereof for the purpose of discernment:

regulating means for limiting the region to be reproduced on the recording medium so as to preclude reproduction of the part of the film outside the desired region; and controlling means for controlling said regulating means so as to preclude reproduction of the margin on the recording medium.

12. A microfilm printer according to claim 11, which further comprises a screen on which the image on the microfilm is projected and switching means for switching the projected light between first light path for projecting the image on the microfilm onto said screen and a second light path for projecting the image on said image forming means.

13. A microfilm printer according to claim 11, wherein said discerning means further serves the purpose of discerning as to whether or not image information is present within the range of a prescribed width inwardly of the border line already discerned and said controlling means controls said regulating means so as to prohibit reproduction of the margin when the presence of the image information within the range is confirmed and controlling said regulating means so as to limit the reproduction of the margin and the range of the prescribed width when the absence of the image information within the range is confirmed.

14. An image forming apparatus, comprising:

original document mounting means provided with a mounting region for mounting an original document;

image forming means for forming on a recording medium the image of an original in said original document mounting region;

regulating means for limiting image formation by said image forming means in a desired portion in said original document mounting region:

discerning means for discerning whether or not image information is present within the range of a prescribed width inwardly from the edge of the original document; and controlling means for controlling said regulating means so as to preclude reproduction of the part of the original document outside the edge thereof when the image information is present within the range of a prescribed width and preclude reproduction of the part outside the edge and the range of the prescribed width when the image information is absence from the range of the prescribed width.

15. An image forming apparatus, comprising:

original document mounting means provided with a mounting region for mounting an original document;

image forming means for reproducing on a recording medium the image of an original document mounted on said mounting region;

detecting means for feeding out the image projected in response to a projected light sequentially outwardly from the central part thereof;

discerning means for discerning the edge of an original document based on said signals from said detecting means;

regulating means for limiting a region of image formation so as to preclude reproduction of image in the part outside the desired region on said original document mounting means: and controlling means for controlling said regulating means so as to limit the region to be reproduced on said recording medium.

16. An image forming apparatus according to claim 15, wherein said discerning means further serves the purpose of discerning whether or not image information is present within said range of a prescribed width inwardly of the edge already discerned, and said controlling means control said regulating means so as to preclude reproduction of the part outside said edge when the image information is present in the range of prescribed width and preclude the reproduction of the part outside the edge and the range of the prescribed width when the image information is absent from the range of the prescribed width.

17. A method for the discernment of image information by the use of an image forming apparatus for reproducing the image of an original document on a recording medium, which method comprises the steps of detecting the density of the image of the original document sequentially outwardly from the central part thereof and, in each occasion of said detection, effecting a decision as to whether or not the image is that of an edge.

18. A method for the discernment of image information by the use of an image forming apparatus for reproducing the image of an original document on a recording medium, which method comprises the steps of:

detecting the information as to the density of the image of an original document, memorizing said information on the density:

taking out of the memory device the information stored therein sequentially outwardly from the central part of the image, and discerning the edge of the image information based on the information read out of the memory device.

19. A method for forming an image of an original document on a recording medium, which method comprises the steps of:

detecting the information on the density of an original document containing an image information;

discerning the edge of the image information based on the information on density;

examining the image information thereby deciding whether image information is present within the range of a prescribed width inwardly of the edge of image: and precluding reproduction of image in the part outside the edge of image when the image information is present within the range of the prescribed width and precluding reproduction of image in the part outside the edge of image and within the range of prescribed with inwardly of the edge of image when the image is absent from the range.

20. A method according to claim 19, wherein said discernment of the edge of image information is performed outwardly from the central part of the region of image information allowed to be reproduced.

* * * * *

UNITED STATES PATENT AND TRADEMARK OFFICE
CERTIFICATE OF CORRECTION

PATENT NO. : 5,065,182        Page 1 of 3

DATED : November 12, 1991

INVENTOR(S) : Masafumi Fujita, et al.

It is certified that error appears in the above-identified patent and that said Letters Patent is hereby corrected as shown below:

In col. 1 of the cover page, please change the title of the patent (numbered item "[54]") from "IMAGE FORMING SYSTEM" to --MICROFILM CAMERA FOR REPRODUCING AN IMAGE INFORMATION FRAME RECORDING ON MICROFILM--.

In col. 1, line 54, change "fulfil" to --fulfill--.

In col. 4, line 67, change "leans" to --lens--.

In col. 5, line 46, change "vene" to --vane--.

In col. 7, line 17, change "A" to --A1--.

In col. 11, line 21 (Claim 1, line 7), change ":" (colon) to --;-- (semicolon).

UNITED STATES PATENT AND TRADEMARK OFFICE
CERTIFICATE OF CORRECTION

PATENT NO. : 5,065,182

DATED : November 12, 1991

INVENTOR(S) : Masafumi Fujita, et al.

It is certified that error appears in the above-identified patent and that said Letters Patent is hereby corrected as shown below:

In col. 11, line 54 (Claim 4, line 6), change ":" (colon) to --;-- (semicolon).

In col. 11, line 56 (Claim 4, line 8), change ":" (colon) to --;-- (semicolon).

In col. 12, line 17 (Claim 7, line 3), change ":" (colon) to --;-- (semicolon).

In col. 12, line 25 (Claim 7, line 11), change ":" (colon) to --;-- (semicolon).

In col. 12, line 28 (Claim 7, line 14), change ":" (colon) to --;-- (semicolon).

In col. 13, line 48 (Claim 14, line 10), change ":" (colon) to --;-- (semicolon).

UNITED STATES PATENT AND TRADEMARK OFFICE
CERTIFICATE OF CORRECTION

PATENT NO. : 5,065,182

DATED : November 12, 1991

INVENTOR(S) : Masafumi Fujita, et al.

It is certified that error appears in the above-identified patent and that said Letters Patent is hereby corrected as shown below:

In col. 13, line 60 (Claim 14, line 22), change "absence" to --absent--.

In col. 14, line 10 (Claim 15, line 17), change ":" (colon) to --;-- (semicolon).

In col. 14, line 41 (Claim 18, line 7), change ":" (colon) to --;-- (semicolon).

In col. 14, line 57 (Claim 19, line 11), change ":" (colon) to --;-- (semicolon).

In col. 14, line 63 (Claim 19, line 17), change "with" to --width--.

Signed and Sealed this

Eighteenth Day of May, 1993

*Attest:*

MICHAEL K. KIRK

*Attesting Officer*     *Acting Commissioner of Patents and Trademarks*